May 3, 1927.　　　　　　　　　　　　　　　　1,626,924
C. W. EGGENWEILER ET AL
MACHINE FOR TRIMMING THE EDGES OF BEARING OR LIKE SECTIONS
Filed Nov. 17, 1924　　　4 Sheets-Sheet 1
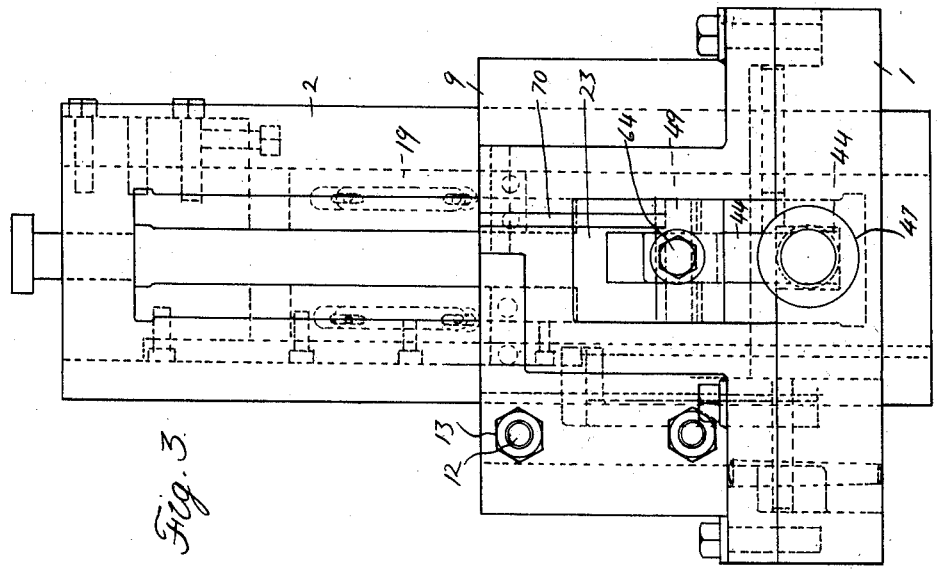
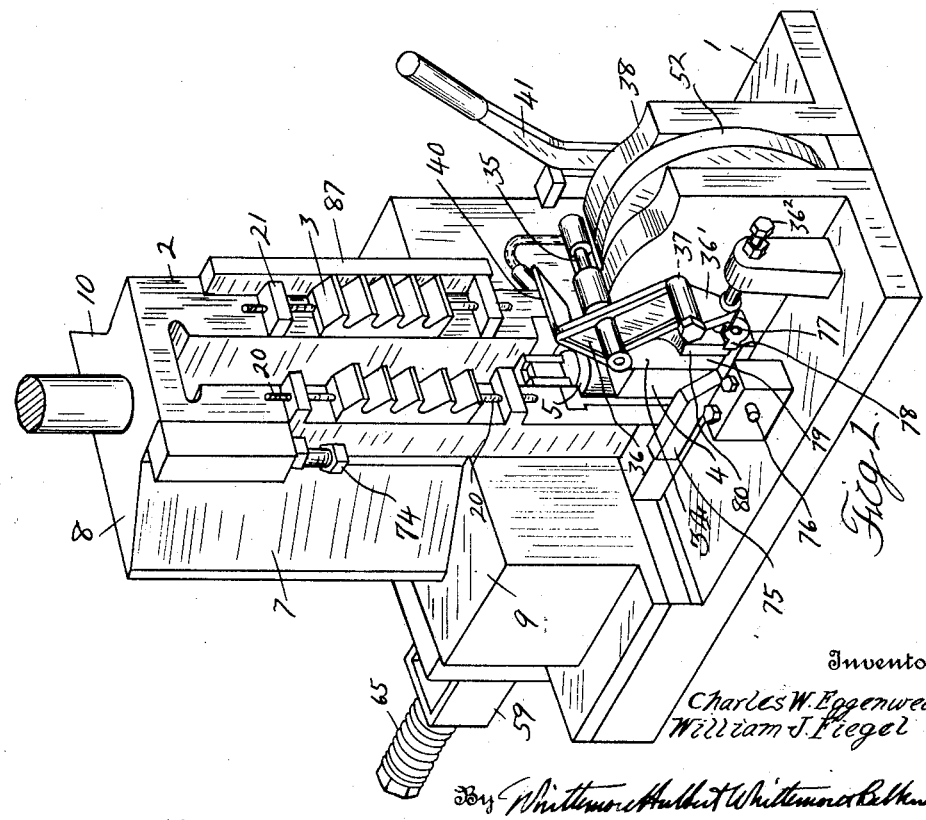
Inventors
Charles W. Eggenweiler
William J. Fiegel
By Whittemore Hulbert Whittemore Belknap
Attorneys

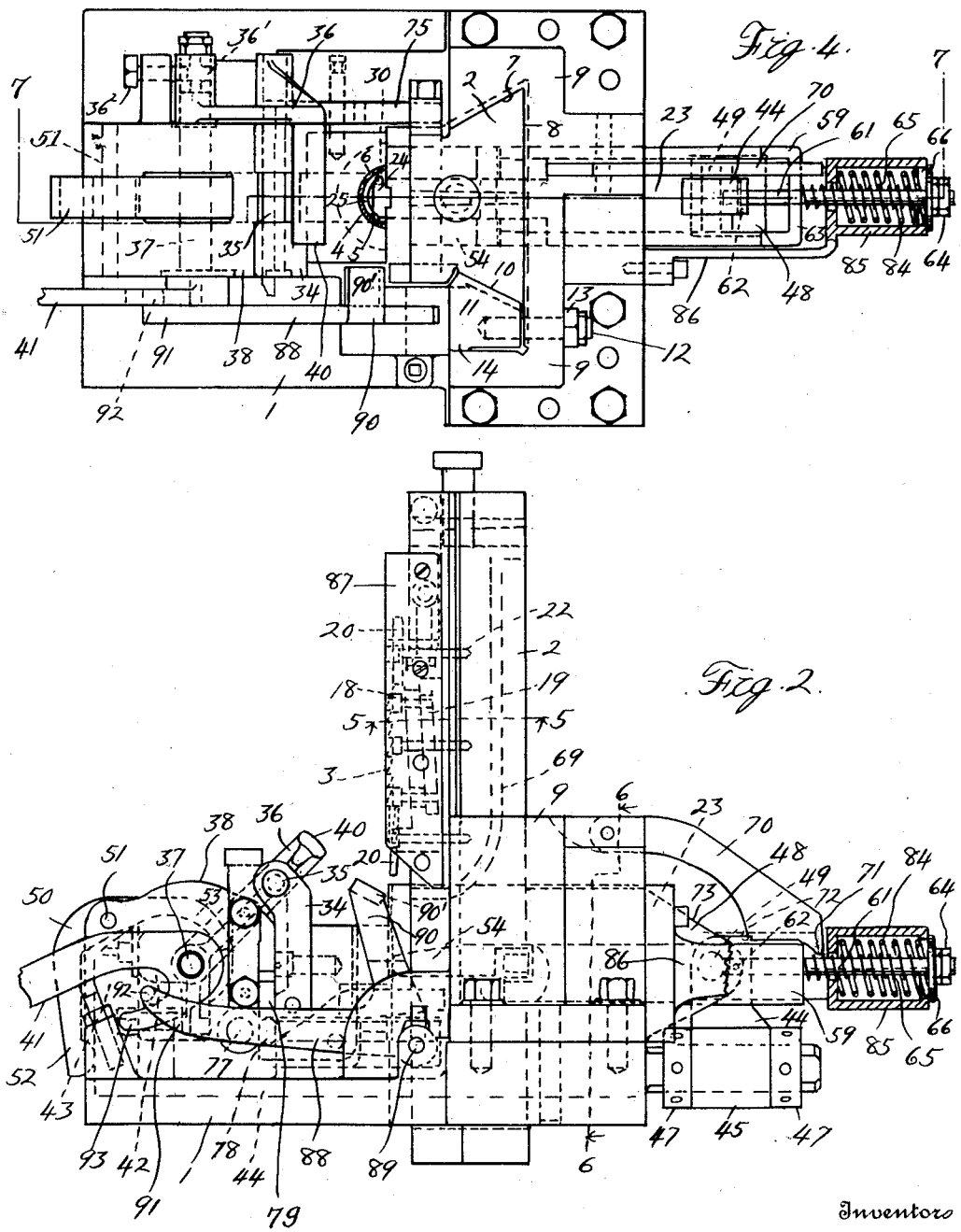

May 3, 1927. 1,626,924
C. W. EGGENWEILER ET AL
MACHINE FOR TRIMMING THE EDGES OF BEARING OR LIKE SECTIONS
Filed Nov. 17 1924 4 Sheets-Sheet 3

Inventors
Charles W. Eggenweiler
William J. Fiegel

By Whittemore Hulbert Whittemore Belknap
Attorney

Patented May 3, 1927.

1,626,924

UNITED STATES PATENT OFFICE.

CHARLES W. EGGENWEILER AND WILLIAM J. FIEGEL, OF DETROIT, MICHIGAN, ASSIGNORS, BY MESNE ASSIGNMENTS, TO BOHN ALUMINUM AND BRASS CORPORATION, A CORPORATION OF MICHIGAN.

MACHINE FOR TRIMMING THE EDGES OF BEARING OR LIKE SECTIONS.

Application filed November 17, 1924. Serial No. 750,502.

The invention relates to machines for trimming the bearing or like sections and refers more particularly to machines for trimming the edges of semi-cylindrical segments or half bearings or like sections. One of the objects of the invention is the provision of an improved machine which successively provides a section, clamps the section in place, and trims the section. Other objects are to provide means for effecting a predetermined pressure to position the section; to provide means for effecting a predetermined pressure to clamp the section; to provide adjustable trimming means; to provide co-operating clamping members one of which is free to move relative to the other to provide for proper clamping the section; to provide means for relieving the section from the trimming means after the section has been trimmed; and to provide means dependent upon movement of the trimming means for moving parts of the machine out of the path of travel of the trimming means.

With these as well as other objects in view, the invention resides in the novel features of construction and combinations and arrangements of parts as more fully hereinafter set forth;

In the drawings:

Figure 1 is a perspective view of a machine embodying our invention;

Figure 2 is a side elevation thereof;

Figure 3 is a rear elevation thereof;

Figure 4 is a plan view thereof;

Figure 5:
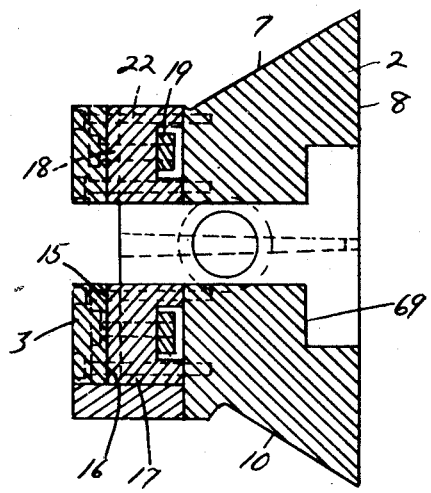
Figure 6:
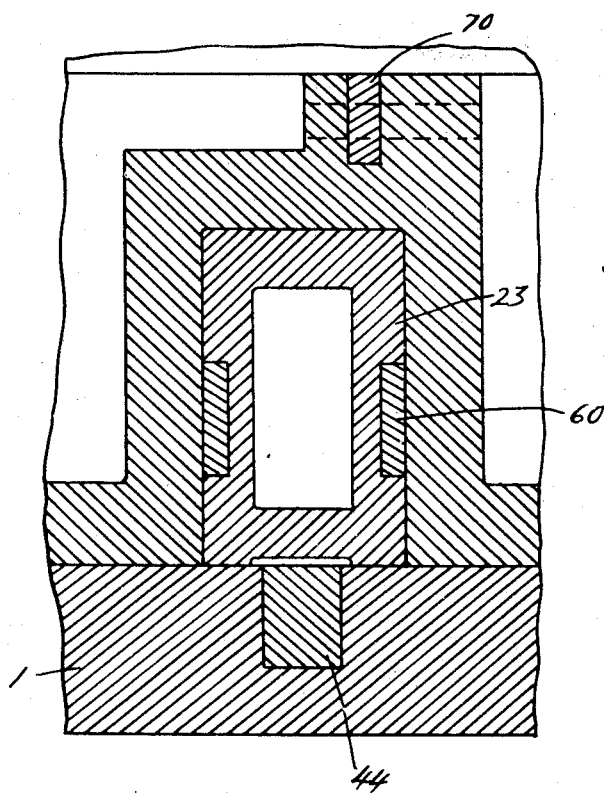
Figure 7:
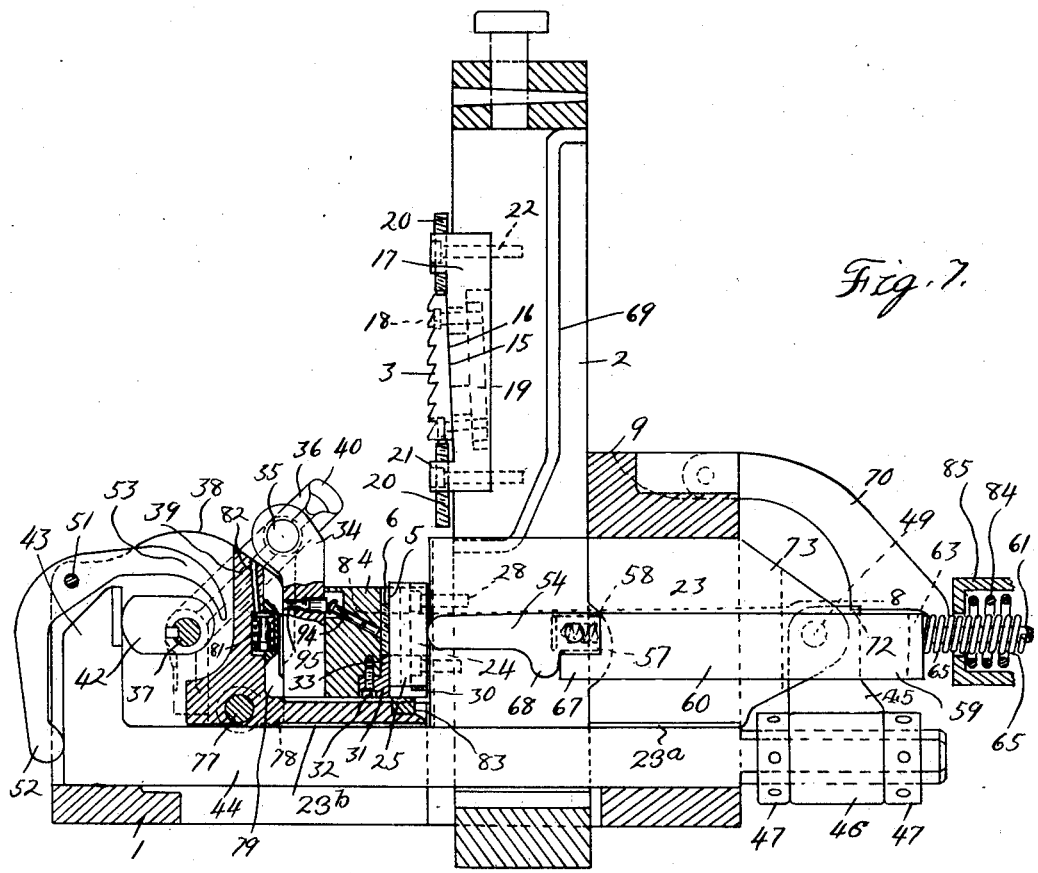
Figure 8:
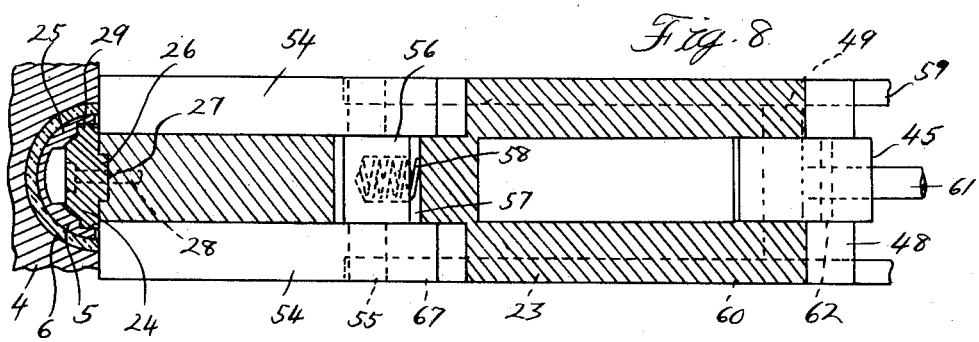

Figures 5 and 6 are cross sections respectively on the lines 5—5 and 6—6 of Figure 2;

Figure 7 is a cross section on the line 7—7 of Figure 4;

Figure 8 is a cross section on the line 8—8 of Figure 7.

In general our machine comprises the bed plate 1, the vertically movable ram 2, the cutters 3 upon the front face of the ram and the cooperating front and rear or inner and outer clamping members 4 and 5 respectively for securing the section 6 of the bearing or the like in operative position.

The rear portion of the ram 2 is flared rearwardly and one of its side faces 7 and its rear face 8 slidably engage corresponding faces upon the upright 9 which is secured upon the bed plate 1. The other side face 10 of the flaring portion of the ram slidably engages the inner side face of the gib 11 which latter is secured to the upright 9 by means of the bolts 12 extending through the rear wall of the upright and threadedly engaging the gib and the nuts 13 threaded upon the rear ends of the bolts and abutting the rear wall. To properly align the inner side face of the gib with the adjacent side face of the flaring portion of the ram, the outer side face of the gib is relieved except at its front portion 14 providing a face of comparatively small length for bearing upon the adjacent face of the upright. Also the holes in the rear walls of the upright through which the bolts 12 extend are of sufficient diameter to provide clearance. With this arrangement the contacting faces of the gib and flaring portion of the ram properly align since the gib may rock about the front portion 14 of its outer face. This portion is preferably located at right angles to the center of the inner side face of the gib to facilitate the alignment.

The ram 2 is vertically reciprocated by suitable means (not shown) such as a punch press ram, which is connected to the upper end of the ram 2. The cutters 3 are adjustably mounted upon the ram to vary the distance between the cutting edges and the front face of the ram and thereby vary the amount of cut upon the bearing or like section. As shown, each cutter is of progressively increasing thickness from its upper toward its lower end and its rear face 15 is inclined relative to the vertical and abuts the wall 16 of the cutter holder 17. This wall 16 has the same inclination as the rear face of the cutter and has a constant thickness. The cutter is secured to this wall by the screw bolts 18 which extend through the cutter and the wall and threadedly engage the plate 19 abutting the rear face of the wall. The apertures in the wall through which the screw bolts pass are vertically elongated so that upon vertically moving the cutter 3 relative to its holder the extent to which the cutting edges of the cutter project beyond the front face of the ram is varied. As shown the cutter is vertically adjusted by the screws 20 abutting its upper and lower ends and threadedly engaging in the lugs 21 at the upper and lower ends of the holder 17. This holder 17 is fixedly secured to the ram by suitable means such as the screw bolt 22, the ram being recessed to receive a portion of the holder.

The rear clamping member 5 is secured to the slide 23 which is transversely reciprocable in the upright 9 and slidably engages the same. This clamping member comprises the vertically extending core 24 and the vertically extending shell 25. The core 24 has the rearwardly extending tongue 26 engaging in the vertical groove 27 in the front face of the slide 23. 28 are screw bolts extending through the core 24 and threadedly engaging the slide, these screw bolts being located on opposite sides of the vertical center of the core. The tongue 26 is made convex so that by adjusting the screw bolts the vertical alignment of the front face of the core may be secured by rocking the core on the convex face. The shell 25 is made resilient and is curved so that its outer radius is less than the inner radius of the bearing or like section to accommodate sections varying slightly in thickness of wall. This shell has near its opposite edges vertical grooves engageable with vertical tongues 29 upon the core whereby the shell is secured to the core. Also the front or intermediate portion of the shell is spaced from the core. For limiting the downward movement of the shell relative to the core there is the screw bolt 30 threaded into the core and having its head projecting beyond the side edge of the core to form a shoulder engageable by the lower end of the shell.

The front clamping member 4 has its rear face made concave with a radius equal to the outer radius of the final bearing or like section. Thus the bearing is located from the outside surface for the cutting or trimming operation, the shell 25 merely serving to clamp the bearing in place. This outer surface of the bearing is preferably a finished surface so that by locating the bearing from the outer surface, as distinguished from the inner surface, any irregularities in bearing wall thickness will not affect the final transverse height of the bearing after the trimming operation. This clamping member has secured thereto the bearing or like section supporting member 31 which is detachably secured by suitable means such as the screw bolt 32. This supporting member has an upwardly extending projection 33 extending adjacent to the rear concave face of the front clamping member. This supporting member is interchangeable with other supporting members having projections of different heights, it being essential that the proper supporting member be used to secure the longitudinal center of the bearing or like section in horizontal alignment with the longitudinal center of the core 24 of the rear clamping member. The front clamping member 4 has as a part thereof an arm 34 and is rigidly secured by suitable means, such as screw bolts, to this arm 34 which is pivotally connected at 35 to the lever 36. This lever is journaled upon the shaft 37 which extends transversely through the vertically extending bifurcations 38 upon the bed plate 1 at its front end, these bifurcations being connected at their rear edges by the integral wall 39 which is positioned in front of the front clamping member 4 when the latter is in operative position. The arrangement is such that with the front clamping member in operative position the lever 36 may be swung forward or in a counter-clockwise direction about the rock shaft 37 thereby raising the clamping member and moving the same forward by means of the arm 34, the free end of the arm 34 sliding over the upper edge of the wall 39. The free end of the lever 36 is provided with the transverse handle 40 for facilitating the movement of the front clamping member.

For the purpose of actuating the slide 23 after the front clamping member 4 has been moved to operative position, to thereby clamp the bearing or like section 6 in position there is the lever 41 secured upon one end of the rock shaft 37 adjacent to a bifurcation 38. The rock shaft has rigidly secured thereto the cam 42 which is located between the bifurcations 38 and which upon rotation of the rock shaft is engageable with the upwardly extending end 43 of the draw bar 44 which extends longitudinally of the bed plate 1 beyond the upright 9 and beneath the slide 23. The front and rear ends only of the draw bar are supported upon the bed plate and clearance 23$^a$ is provided between the draw bar and slide, and likewise clearance 23$^b$ may be provided the arrangement being such that the draw bar may freely bend or spring in a vertical plane. 45 is a post having a hub 46 sleeved over the rear end of the draw bar and positioned by means of the nuts 47 threadedly engaging the rear end of the draw bar at opposite ends of the hub. The post 45 extends upwardly between the bifurcations 48 at the rear end of the slide 23 and is secured thereto by the transverse pin 49.

To compel movement of the rear clamping member and the slide to which this clamping member is secured rearwardly or away from the front clamping member there is the bell crank lever 50 which is pivotally mounted at 51 between the bifurcations 38 and above the upwardly extending end 43 of the draw bar. This bell crank lever has a depending portion 52 which is engageable with the front face of the upwardly extending end 43 of the draw bar and the rearwardly extending portion 53 which is curved downwardly and is engageable with the cam 42 when the lever 41 is swung rearwardly and returned to its original position.

For the purpose of positioning the side edges of the bearing or like section 6 so that they will extend transversely of the machine when the section is in its clamped position there are the fingers 54 upon opposite sides of the slide 23 and having their forward ends adapted to engage the side edges of the bearing or like section. These fingers are journaled upon the gudgeons 55 which are in alignment and extend from opposite sides of the square block 56. This square block is positioned in the square hole 57 extending transversely through the slide 23, the hole having a length greater than that of the block. 58 is a coil spring abutting the rear face of the hole 57 and extending forwardly into the block 56 and abutting the same, this spring normally tending to move the block 56 forwardly and also the fingers 54. 59 is a yoke having the arms 60 slidably engaging in grooves in the opposite sides of the slide 23. These arms are located at opposite ends of the pin 49 and thereby hold the latter from accidental disengagement. 61 is a rod pivotally connected at 62 to the post 45 in rear of the pin 49. This rod extends through the base 63 of the yoke and has threaded upon its rear end the nuts 64. 65 is a coil spring surrounding the portion of the rod between the base of the yoke and the abutment washer 66 which rests against the front nut. The arms 60 of the yoke have at their front ends the forwardly projecting lower portions 67 and the fingers 54 have near their rear ends the depending lugs 68 which are positioned so that their rear faces are engageable with the front faces of the arm portions 67 when the yoke is moved forwardly. After the fingers have engaged the side edges of the bearing or like section to properly align the same it is essential that these fingers be removed before the cutters 3 engage the side edges of the section. This is accomplished by providing the ram with the inner shoulders 69 there being one shoulder for each finger. These shoulders pass on opposite sides of the slide 23 while the ram is descending and are curved upwardly and rearwardly their lower portions being located below the cutters.

It is also essential that the fingers be held from engaging the finished side edges of the bearing or like section after the cutters have passed upwardly beyond the same. For this purpose there is the pawl 70 which is pivotally mounted at its rear end upon the upright 9 in rear of the ram. This is curved rearwardly and downwardly and has the nose 71 which is engageable with the front face of the base 63 of the yoke when the latter has been moved rearwardly by the downward swinging movement of the fingers 54. The pawl also has, at its free end and in advance of the nose 71, the shoulder 72 which is engageable with the upper inclined surface 73 of one of the bifurcations at the rear of the slide 23, whereby upon rearward movement of this slide the pawl will be swung upwardly and its nose disengaged from the yoke.

It is also essential that the trimmed side edges of the bearing or like section 6 be moved away from the path of travel of the cutters while the latter are returning to their original positions after the cuts have been made. For this purpose the ram 2 is provided with the adjustable set screw 74 which is preferably located above the uppermost cutting edges of the cutters 3. The set screw is engageable with the lever 75 which is pivoted at 76 upon the bed plate 1. 77 is a rock shaft journaled in the rear ends of the bifurcations 38 near their bases. 78 are cams keyed upon the ends of the rock shaft 77 adjacent to the outer faces of the bifurcations 38. 79 is a wedge shaped backing plate for the arm 34 having a slightly greater thickness at its upper end than at its lower end. The rear face of the wall 39 is inclined upwardly and for engagement by the front face of the backing plate whereby upon upward movement of the backing plate the arm 34 and front clamping member 4 may move forwardly toward the operator. The backing plate 79 is provided at its opposite ends with the projections 80 which are engageable with the cams 78. The rear end of the lever 75 is engageable with one of these cams so that as this lever is rocked about its pivot by the set screw upon the ram the backing plate will be raised allowing the front clamping member to move forward thereby providing clearance between the side edges of the bearing or like section and the cutters.

For the purpose of maintaining the backing plate 79 normally in its lowermost position the rear face of the backing plate and the front face of the wall 39 are provided with complementary recesses which together receive the vertically extending coil spring 81. When the backing plate is moved upwardly the coil spring is compressed and tends to move the backing plate downwardly as soon as the pressure exerted by the cams 78 is removed. To facilitate the movement of the backing plate 79 over the wall 39 and also to maintain the backing plate adjacent to the wall the latter is provided with the oil passageway 82 which leads to the recesses containing the coil spring 81. This oil passes from these recesses between the adjacent surfaces of the wall and backing plate and produces an oil film which will hold the backing plate to the wall but permit relative sliding movement therebetween.

It is very important that the front clamping member 4 be freely movable to a limited extent to properly align with the rear clamping member 5 in order to properly clamp the bearing or like section 6 therebetween. Therefore the hole in the lever 36 provides considerable clearance for the pin 35 connecting this lever to the arm 34. Furthermore the rear face of the backing plate 79 is provided with vertically spaced points of contact for the arm 34 and the bed plate 1 has secured thereto the hardened supporting plate 83 which has a limited area of contact with and affords the only support beneath the clamping member and its arm. This plate is located adjacent to the rear end of the clamping member. Horizontal movement of the clamping member is also provided for, the portion of the pin 35 which is adapted to be engaged by the arm 34 being longer than the width of the arm to provide clearance for movement of the latter longitudinally of the pin. The lever 36 also has a depending portion 36' below its pivot for engagement with the set screw 36² which is adjustably secured to the bed plate. With this latter arrangement the weight of the lever is removed, whereby easier adjustment of the front clamping member is obtained.

To hold the slide 23 and rear clamping member 5 in their rearwardly adjusted positions there is the coil spring 84, the rear end of which abuts the abutment washer 66 and the front end of which abuts the housing 85 carried by the arm 86, the front end of which is secured to the upright 9. This spring is placed under compression upon forward movement of the rear clamping member and assists in returning the same and associated parts to their original positions. This spring also exerts sufficient force to normally retain the parts in their original positions.

To prevent damaging of the machine in the event that the bearing or like section is not properly clamped in place when the ram is tripped there is the cam plate 87 which is secured to the side of the ram 2 near its front. The lower end of this cam plate is inclined upwardly and forwardly. 88 is a bell crank lever pivotally mounted at 89 upon the bed plate and having an upwardly extending arm 90, which is provided with the transverse projection 90' for engagement with the lower inclined end of the cam plate 87. The bell crank lever also has the forwardly extending arm 91 which is provided with the transverse projection 92 engageable with the hooked or cammed end 93 of the lever 41. This hooked or cammed end is shaped to compel swinging of the bell crank lever 88 about its pivot to move the transverse projection at the upper end of the bell crank arm 90 from the path of travel of the cam plate 87 when the lever 41 is swung forwardly to clamp the bearing or like section. Therefore if the lever 41 were in its original position and the ram were tripped, downward movement of the ram would bring the cam plate into engagement with the transverse projection upon the upwardly extending arm of the bell crank lever compelling the same to swing thereby forcing the lever to swing forwardly to move the associated parts including the rear clamping member to their proper positions. As a consequence the ram or the cutters will cause no damage during their continued downward movement.

In operation and assuming the ram 2 and the cutters 3 to be in their upper or original positions, the lever 41 in its upper or original position and therefore the parts including the rear clamping member 5, which are operated by swinging the lever 41, in their rear or original positions and the front clamping member 4 located above the uprights 38. The bearing or like section 6 is placed in the front clamping member 4 and against the projection 33 of the positioning member 31. The lever 36 is then swung rearwardly allowing the front clamping member to swing down upon the bearing block 83 of the bed plate 1 and the front face of the arm 34 to rest against the vertically spaced bearings upon the backing plate 79 which is in its lowermost position. The lever 41 is then swung forwardly moving the bell crank 88 out of the path of travel of the cam plate 87. This lever through the rock shaft 37 and cam 42 moves the draw bar 44 forward which in turn through the post 45 moves the slide 23 and rear clamping member 5 forward and also the yoke 59 and fingers 54 forward, the free ends of the latter being positioned to engage the side edges of the bearing or like section prior to the final forward movement of the rear clamping member. During the forward movement of the rear clamping member 5, the front or intermediate portion of the shell 25 first engages the inner surface of the bearing or like section and then the shell gradually assumes the contour of the inner surface and in doing so its opposite edges slide outwardly upon the tongues of the core. The strength of the coil spring 58 determines the pressure exerted by the fingers upon the bearing or like section and when this pressure becomes equal to the strength of the spring the latter is compressed during the final forward movement of the slide and rear clamping member. The pressure exerted by the rear clamping member upon the bearing or like section is dependent upon the resistance offered by the draw bar to bending or springing vertically. In other words, the draw bar buckles vertically if the lever 41 is swung forwardly after the predetermined pressure is exerted upon the bearing or like section. During this clamping operation the front clamping member is free to move so that its clamping face will be concentric the clamping face of the rear clamping member. The ram is then tripped and moves downwardly carrying the cutters therewith. These cutters trim the side edges of the bearing or like section and after the last cutting edges of the cutters have passed the bearing or like section the set screw 74 upon the ram engages the lever 75 and through the rock shaft 77 and cams 78 raises the backing plate 79 against the effort exerted by the coil spring 81. The raising of this backing plate permits the front clamping member 4 to move forwardly to a slight extent under the pressure exerted by the draw bar 44 upon the slide 23 and rear clamping member 5, thereby providing clearance between the finished side edges of the bearing or like section and the cutters 3 so that upon the return movement of the latter the side edges of the bearing or like section are not engaged. During the initial downward movement of the ram and its cutters, the fingers 54 are swung downwardly and out of contact with the side edges of the bearing or like section by the cam shoulders 69 upon the ram engaging the fingers. This downward swinging of the fingers compels rearward movement of the yoke 59 and consequent increased compression of the coil spring 65, this spring having previously functioned to move the yoke and fingers forward. The rearward movement of the yoke is sufficient to permit engagement of the nose 71 of the pawl 70 with the front face of the base 63 of the yoke whereby the yoke is held from forward movement. The fingers 54 remain in their downward positions by their own weight. When the trimming of the side edges of the bearing or like section has been completed the lever 41 may be returned to its original position at which time the cam 42 upon the rock shaft 37 to which the lever is secured engages the rearwardly extending arm 53 of the bell crank 50 compelling the latter to swing about its pivot 51 and to move its depending arm 52 into engagement with the draw bar 44 thereby moving the latter rearwardly and correspondingly moving the slide 23 and rear clamping member 5. As the slide 23 is moved rearwardly its upper inclined face 49 comes into contact with the releasing portion 72 of the pawl 70 swinging the latter upwardly and disengaging its nose from the base of the yoke, when the coil spring 65 will then function to move the yoke 59 forward a sufficient distance to raise the fingers 54 to their original positions. The front holding member 4 may then be returned to its original position at which time the bearing or like section may be removed. This removal is facilitated by means of the cooperating pins 94 and 95, the pin 94 slidably engaging in the front clamping member and the pin 95 slidably engaging in the arm 34 and being adapted to contact at one end with the pin 94 and at the other end with the upper edges of the backing plate 79 which has been returned to its original position by the coil spring 81 and the wall 39 and finally with the upper edge of the rearwardly extending arm 53 of the bell crank 50 which has been swung upwardly by cam 42. This pin engages the arm 53 when the clamping member 4 is moved about its pivotal support to an inoperative position. The arrangement is such that the pins function as ejectors for the bearing or like section.

What we claim as our invention is:—

1. In a machine for trimming half bearing or like sections, the combination with cooperating clamping members engageable with a section, of means for circumferentially adjusting the section prior to the clamping of the same, and means for trimming the section after the clamping of the same.

2. In a machine for trimming bearing or like sections, the combination with relatively movable cooperating clamping members for clamping a section, of means engageable with the side edges of the section prior to the clamping of the section for adjusting the same, and means for trimming the side edges of the section after the clamping of the same.

3. In a machine for trimming bearing or like sections, the combination with a clamping member, of a cooperating clamping member movable toward said first mentioned clamping member to clamp a section, means movable toward said first mentioned clamping member and engageable with the side edges of the section to align the same prior to the clamping of the section, and means movable in a direction transverse to that of said movable clamping member for trimming the side edges of the section after the same has been clamped in place.

4. In a machine for trimming bearing or like sections, the combination with a clamping member, of a cooperating clamping member movable toward said first mentioned clamping member to clamp a section, means movable toward said first mentioned clamping member and engageable with the side edges of the section to position the same prior to the clamping of the section, means movable in a direction transverse to that of said movable clamping member for trimming the side edges of the section after the same has been clamped in place, and means engageable with said positioning means for moving the same away from the side edges of the section prior to engagement of the trimming means with the side edges of the section.

5. In a machine for trimming bearing or like sections, the combination with a clamping member, of a cooperating clamping member movable toward said first mentioned clamping member for clamping a section in place, fingers movable toward said first mentioned clamping member and engageable with the side edges of the section prior to the clamping of the same, and means operable after the clamping of the section to move said fingers away from the side edges of the section and then trim the side edges.

6. In a machine for trimming the edges of bearing or like sections, the combination with a clamping member, of a cooperating clamping member movable toward said first mentioned clamping member for clamping a section in place, fingers movable toward said first mentioned clamping member and engageable with the side edges of the section prior to the clamping of the same, yieldable means for moving said fingers toward said first mentioned clamping member, a ram movable transversely of said movable clamping member, means upon said ram engageable with said fingers for moving the same away from the side edges of the section, and means upon said ram for trimming the side edges of the section.

7. In a machine for trimming bearing or like sections, the combination with a clamping member, of a cooperating clamping member movable toward said first mentioned clamping member for clamping a section in place, a slide carrying said second mentioned clamping member, spring pressed fingers carried by said slide and engageable with the side edges of the section prior to the clamping of the same in place, a ram movable transversely of said slide, shoulders upon said ram engageable with said fingers to swing the same away from the side edges of the section and cutters upon said ram for trimming the side edges of the section.

8. In a machine for trimming bearing or like sections, the combination with a clamping member, of a cooperating clamping member, a slide carrying said cooperating clamping member and movable toward said first mentioned clamping member for clamping a section in place, fingers upon opposite sides of said slide and engageable with the side edges of the section for positioning the same prior to the clamping of the section, a pivot for said fingers carried by said slide, a spring for yieldably forcing said pivot toward said first mentioned clamping member, a ram movable transversely of said slide and provided with means for swinging said fingers away from the side edges of the section and also with means for trimming the side edges of the section, and means mounted upon said slide and engageable with said fingers adapted to return said fingers to their original positions.

9. In a machine for trimming bearing or like sections, the combination with a clamping member, of a cooperating clamping member, a slide carrying said cooperating clamping member and movable toward said first mentioned clamping member, fingers upon opposite sides of said slide and engageable with the side edges of the section, a pivot for said fingers slidably engaging said slide, a spring engageable with said pivot for yieldably moving said fingers toward said first mentioned clamping member, a reciprocable ram movable transversely of said slide and having shoulders upon opposite sides of said slide and engageable with said fingers to swing the same downwardly out of contact with the side edges of the section, cutters upon said ram engageable with the side edges of the section, a yoke slidably engaging said slide and provided with means engageable with said fingers to return the same to their original positions, a member connected to said slide for moving the same toward and away from said first mentioned clamping member, spring pressed means connected to said member for yieldably moving said yoke toward said first mentioned clamping member, and a pawl engageable with said yoke upon downward movement of said fingers to hold said yoke from movement, said pawl being dependent for its release from said yoke upon movement of said slide away from said first mentioned clamping member.

10. In a machine for trimming bearing or like sections, the combination with a clamping member, of a cooperating clamping member movable toward said first mentioned clamping member for clamping a section in place, and means for exerting a predetermined pressure upon said cooperating clamping member to move the same toward said first-mentioned clamping member, said means including a draw-bar adapted to buckle after the predetermined pressure has been reached.

11. In a machine for trimming bearing or like sections, the combination with a clamping member, of a cooperating clamping member and means for exerting a predetermined pressure upon said cooperating clamping member to move the same toward said first-mentioned clamping member, said means including a draw bar extending in the direction of movement of said cooperating clamping member, and a post connecting said draw-bar to said cooperating clamping member, said draw bar being free to buckle after the predetermined pressure has been reached.

12. In a machine for trimming bearing or like sections, the combination with cooperating clamping members for clamping a section in place, of reciprocable means movable in one direction for trimming the section, and means for retaining one of said clamping members in place during the trimming operation, including a member bearing upon said clamping member, said member being movable to permit said clamping member to move away from the path of said trimming means prior to the return movement thereof.

13. In a machine for trimming bearing or like sections, the combination with a clamping member, of a cooperating clamping member for clamping a section in place, reciprocable means movable in one direction for trimming the section, a wedge shaped backing plate for said first mentioned clamping member, and means for moving said backing plate subsequent to the trimming operation and prior to the return movement of said trimming means to relieve its pressure upon said first mentioned clamping member.

14. In a machine for trimming bearing or like sections, the combination with a clamping member, of a cooperating clamping member for clamping a section in place, a reciprocable ram, means upon said ram for trimming the section, a wedge shaped backing plate for said first mentioned clamping member, and means dependent upon the movement of said ram for moving said backing plate to relieve its pressure upon said first mentioned clamping member after the trimming operation and prior to the return movement of said ram.

15. In a machine for trimming bearing or like sections, the combination with cooperating members for clamping a section, of means for trimming the section, a wedge shaped backing plate for one of said clamping members, means for moving said backing plate to relieve its pressure upon said clamping member after the trimming operation, and a spring for normally retaining said backing plate in a predetermined position.

16. In a machine for trimming bearing or like sections, the combination with a bed plate, of clamping members supported upon said bed plate, said clamping members being adapted to clamp a section in place, reciprocable means for trimming the section, a backing plate for one of said clamping members having a wedging engagement with a wall on said bed plate, a spring engageable with said backing plate for normally retaining the same in a predetermined position, means for supplying lubricant between the bearing surfaces of said backing plate and bed plate, and means for moving said backing plate to relieve its pressure upon said clamping member after the trimming operation and prior to the return movement of the trimming means.

17. In a machine for trimming bearing or like sections, the combination with a bed plate and an upwardly extending wall thereupon, of cooperating clamping sections supported upon said bed plate and adapted to clamp a section therebetween, reciprocable means movable in one direction for trimming the section, a wedge shaped backing plate for one of said clamping members movable over said upwardly extending wall, said wall and backing plate being provided with normally registering recesses, a coil spring within said recesses, means for supplying lubricant to said recesses and between the bearing surfaces of said backing plate and upwardly extending wall, and means dependent upon movement of said trimming means for moving said backing plate over said upwardly extending wall to relieve its pressure upon said clamping plate.

18. In a machine for trimming bearing or like sections, the combination of cooperating members for clamping a section therebetween, and means for trimming the section, one of said clamping members comprising a core rotatably adjustable about its transverse axis, and a resilient shell secured to said core.

19. In a machine for trimming bearing or like sections, the combination of cooperating members for clamping a section therebetween, means movable transversely of said members for trimming the section, and a support for one of said clamping members having a groove extending in the direction of movement of said trimming means, the clamping member carried by said support comprising a core having a convex tongue engaging in said groove, and a resilient shell mounted upon said core.

20. In a machine for trimming bearing or like sections, the combination of cooperating clamping members, and a support for one of said clamping members comprising a member therebeneath and having contact therewith at spaced points, and a member engageable with one side of said clamping member at vertical spaced points.

21. In a machine for trimming half bearing or like sections, the combination with a clamping member adapted to receive a section and to be swung through an arcuate path to operative position, of a second clamping member cooperating with said first mentioned clamping member to clamp said section in place, said second clamping member being movable toward and away from said first mentioned clamping member, and means movable transversely of said first clamping member a predetermined distance therefrom to trim the edges of said section.

22. In a machine for trimming bearing or like sections, the combination with a clamping member movable through a vertical path to operative position, of a cooperating clamping member movable toward said first mentioned clamping member when in operative position, a pivotal lever, a loose connection between said lever and first mentioned clamping member permitting movement of said first mentioned clamping member, both vertically and horizontally relative to said lever, a support beneath said first mentioned clamping member having contact therewith at spaced points, and a backing plate for said first mentioned clamping member having vertical spaced contacting surfaces.

23. In a machine for trimming bearing or like sections, the combination with a clamping member, of a cooperating clamping member movable toward and away from said first mentioned clamping member, a draw-bar for actuating said second mentioned clamping member, a rockable member engageable with said draw-bar, and a member engageable with said draw-bar and said rockable member for moving said draw-bar in opposite directions.

24. In a machine for trimming bearing or like sections, the combination with a clamping member, of a cooperating clamping member, a draw-bar for actuating said cooperating clamping member, a cam for engaging said draw-bar to move the same in one direction, and a rockable lever having a portion engageable with said draw-bar and a second portion engageable with said cam for moving said draw-bar in the opposite direction.

25. In a machine for trimming bearing or like sections, the combination with a clamping member, of a cooperating member movable toward said first mentioned clamping member, means for moving said cooperating member toward and away from said first mentioned clamping member, including a pivotal lever, a ram movable transversely of said clamping members, and safety means operated by the ram and operable through said pivotal lever for moving said cooperating clamping member toward said first mentioned clamping member.

26. In a machine for trimming bearing or like sections, the combination with a clamping member, of a cooperating clamping member for clamping a section therebetween, a reciprocable ram movable transversely of said clamping members, means upon said ram for trimming the section, a pivotal lever for actuating said cooperating clamping member, and safety means for compelling the movement of said cooperating clamping member toward said first mentioned clamping member, said safety means including a cam plate upon said ram, and a rockable lever engageable with said cam plate and with said pivotal lever.

27. In a machine for trimming bearing or like sections, the combination with a clamping member having a concave face with a radius equal to the radius of the outer face of the final bearing or like section, of a cooperating clamping member engageable with the inner face of the bearing or like section for forcing its outer face into contact with the concave face of said first-mentioned clamping member, and means for trimming the side edges of the bearing or like section while held between said clamping members.

28. In a machine for trimming bearing or like sections, the combination of cooperating members for clamping a section therebetween, one of said clamping members comprising a core, and a resilient shell slidably secured near its opposite edges to said core and having its intermediate portion spaced from said core.

29. In a machine for trimming bearing or like sections, the combination with a clamping member having a concave face with a radius equal to the radius of the outer face of the final bearing or like section, of a cooperating clamping member comprising a core, and a resilient shell slidably secured to said core near its opposite edges and having its intermediate portion spaced from said core, said shell having its outer face of a radius not greater than the radius of the inner face of the final bearing or like section.

30. In a machine for trimming bearing or like sections, the combination with a clamping member having a fixed concave face of a radius equal to the radius of the outer face of the final bearing or like section, of a cooperating clamping member having a portion yieldably engaging the inner face of the bearing or like section for forcing the same into contact with the concave face of said first-mentioned clamping member.

31. In a machine for trimming bearing or like sections, the combination with cooperating members for clamping a section therebetween, of reciprocable means for trimming the side edges of the section while clamped between said members, and means for actuating said clamping members to move the section away from the path of said trimming means prior to the return movement thereof.

32. In a machine for trimming half bearings or like sections, the combination with edge trimming means, of means engaging the outer finished surface of the half bearing and occupying a predetermined position with reference to the trimming means during the trimming operations and cooperating means resiliently engaging the inner surface of said half bearing for forcing the same uniformly into contact with said first engaging means irrespective of the wall thickness of the half bearing.

33. In a machine for trimming half bearings or like sections, the combination with edge trimming means, of a clamping element engaging the outer finished surface of the half bearing for accurately positioning the same with reference to said trimming means, means for aligning the edges of said half bearing, and a cooperating element engaging the inner surface of said half bearing for forcing the same into contact with said first clamping element.

34. In a machine of the character described, the combination with means for aligning the edges of a half bearing, of means for clamping said half bearing and means for subsequently trimming said edges.

35. In a machine of the character described, the combination with means for clamping a half bearing or like section with the longitudinal edges thereof exposed and edge trimming means, of means for aligning the side edges of said bearing prior to clamping the same.

36. In a machine for trimming half bearings or the like, the combination with edge trimming means operating in a fixed plane, of a member formed with a concave recess accurately engaging the outer finished surface of the half bearing and occupying a predetermined position with reference to said edge trimming means, and a cooperating clamping member including a resilient element engaging the inner surface of said half bearing for holding the same in place irrespective of the wall thickness thereof, and means for moving said element into operative position.

In testimony whereof we affix our signatures.

CHARLES W. EGGENWEILER.
WILLIAM J. FIEGEL.